United States Patent
Brace et al.

(10) Patent No.: US 12,366,145 B2
(45) Date of Patent: Jul. 22, 2025

(54) CONTROL MODULE FOR A DETONATION SUB AND A DETONATION SUB

(71) Applicants: Chris Brace, Sherwood Park (CA); Dave Rusnell, Edmonton (CA)

(72) Inventors: Chris Brace, Sherwood Park (CA); Dave Rusnell, Edmonton (CA)

(73) Assignee: Chris Brace, Sherwood Park (CA)

( * ) Notice: Subject to any disclaimer, the term of this patent is extended or adjusted under 35 U.S.C. 154(b) by 232 days.

(21) Appl. No.: 18/106,696

(22) Filed: Feb. 7, 2023

(65) Prior Publication Data

US 2023/0250711 A1    Aug. 10, 2023

Related U.S. Application Data

(60) Provisional application No. 63/307,327, filed on Feb. 7, 2022.

(51) Int. Cl.
| | | |
|---|---|---|
| E21B 43/1185 | (2006.01) | |
| E21B 47/06 | (2012.01) | |
| E21B 47/07 | (2012.01) | |
| F42C 15/42 | (2006.01) | |
| F42C 21/00 | (2006.01) | |
| F42D 1/05 | (2006.01) | |
| H02H 7/20 | (2006.01) | |

(52) U.S. Cl.
CPC .... *E21B 43/11857* (2013.01); *E21B 43/1185* (2013.01); *E21B 47/06* (2013.01); *E21B 47/07* (2020.05); *F42C 15/42* (2013.01); *F42C 21/00* (2013.01); *F42D 1/05* (2013.01); *H02H 7/20* (2013.01)

(58) Field of Classification Search
CPC ........... E21B 43/1185; E21B 43/11857; E21B 47/06; E21B 47/07; F42C 15/42; F42C 21/00; F42D 1/04; F42D 1/045; F42D 1/05; F42D 1/055; H02H 7/20
See application file for complete search history.

(56) References Cited

U.S. PATENT DOCUMENTS

| | | | |
|---|---|---|---|
| 4,041,865 A | 8/1977 | Evans et al. | |
| 5,460,093 A | 10/1995 | Prinz et al. | |
| 5,811,894 A * | 9/1998 | Buyers ................ | E21B 43/1185 340/856.1 |
| 6,298,924 B1 | 10/2001 | Vaynshteyn et al. | |
| 7,331,290 B1 * | 2/2008 | Keil ........................ | F42C 15/40 102/202.3 |
| 8,161,877 B1 | 4/2012 | Frickey et al. | |

(Continued)

FOREIGN PATENT DOCUMENTS

| | | | | |
|---|---|---|---|---|
| CN | 111734364 A | | 10/2020 | |
| GB | 2195420 A * | | 4/1988 | ............ F42C 11/065 |
| WO | WO-2022014530 A1 * | | 1/2022 | ............. E21D 9/006 |

*Primary Examiner* — Daniel P Stephenson
(74) *Attorney, Agent, or Firm* — Nathan V. Woodruff

(57) ABSTRACT

A control module for a detonation sub includes a control circuit having a switch, a power supply input, a timer circuit, and a detonation signal output electrically connected to a detonator. A power supply is selectively connected in electrical communication to the power supply input. A timer circuit is initialized by activating the switch prior to connecting the power supply and deactivating the switch within an activation time. Once initialized, the timer circuit generates a detonation signal after a detonation time.

23 Claims, 4 Drawing Sheets

(56) References Cited

U.S. PATENT DOCUMENTS

| | | |
|---|---|---|
| 8,369,062 B2 | 2/2013 | Fisher et al. |
| 8,701,560 B2 | 4/2014 | Condit et al. |
| 9,157,718 B2 * | 10/2015 | Ross .................. E21B 43/1185 |
| 9,617,829 B2 | 4/2017 | Dale et al. |
| 10,352,144 B2 | 7/2019 | Entchev et al. |
| 10,830,566 B2 | 11/2020 | Maxted et al. |
| 2009/0293751 A1 | 12/2009 | Van Wyk |
| 2023/0250711 A1 * | 8/2023 | Brace ...................... H02H 7/20 |
| | | 175/4.57 |

* cited by examiner

CONTROL MODULE FOR A DETONATION SUB AND A DETONATION SUB

TECHNICAL FIELD

This relates to a control module, and in particular, a control module designed to prevent unintentional detonation for a downhole tool.

BACKGROUND

A detonation sub may be used as part of a downhole operation and may be carried on a wireline or slickline. In some examples, a detonation sub may be part of, or attached to, a perforation tool used to perforate downhole casing, a sand line cutter, or other types of tools. As the detonation sub involves explosives, care must be taken to avoid unintentional detonation. U.S. Pat. No. 9,157,718 (Ross) entitled "Interruptor sub, perforating gun having the same, and method of blocking ballistic transfer" uses an interruptor sub that allows detonation when certain conditions are met, and is designed to be used in a tubing string.

SUMMARY

According to an aspect, there is provided a control module for a detonation sub, comprising a control circuit having a switch, a power supply input, a timer circuit, and a detonation signal output electrically connected to a detonator, a power supply that is selectively connected in electrical communication to the power supply input, and a timer circuit that is initialized by activating the switch prior to connecting the power supply and deactivating the switch within an activation time, wherein, once initialized, the timer circuit generates a detonation signal after a detonation time According to other aspects, the control module may comprise one or more of the following features, alone or in combination: the switch may be a magnetic switch and may be actuated by proximity to a magnet; the control circuit may fail to initialize if the switch is not deactivated within the activation time; the control circuit may be configured to deactivate the detonation signal if the control circuit detects a fault; the fault may be detected based on readings from one or more of the following: a voltage detector, an internal temperature sensor, an external temperature sensor, and a pressure sensor; the control circuit may be programmed to detect a fault by periodically performing a diagnostic check; and the control circuit may comprise a test mode and an operational mode, the control module accessing the test mode by applying a first voltage and accessing the operational mode by applying a second voltage that is distinct from the first voltage.

According to other aspects, there is provided a detonation sub comprising a control module, a power supply in electrical communication with the control circuit, a detonator connected to receive a detonation signal from the control module, and an explosive charge that is detonated by the detonator.

According to other aspects, there is provided a slickline tool that carries a detonation sub.

According to an aspect, there is provided a method of operating a detonation sub, the detonation sub comprising a control circuit having a switch, a power supply input, a timer circuit, and a detonation signal output, the method comprising the steps of: initiating the timer circuit by: with the switch activated, connecting a power supply to the power supply input, and with the power supply connected to the power supply input, deactivating the switch within an activation time, such that the timer circuit begins timing a detonation time period, the control circuit being adapted to conduct periodic diagnostic checks during the activation time and the detonation time period to detect faults, and to deactivate if a fault is detected, positioning the detonation sub downhole, once the detonation time period ends, permitting the control circuit to generate a detonation signal at the detonation signal output if no faults have been detected, and deactivate the control circuit after the detonation signal has been generated whether detonation has occurred or not.

BRIEF DESCRIPTION OF THE DRAWINGS

These and other features will become more apparent from the following description in which reference is made to the appended drawings, the drawings are for the purposes of illustration only and are not intended to be in any way limiting, wherein.

DETAILED DESCRIPTION OF PREFERRED EMBODIMENTS

When handling explosives, care must be taken to ensure they are not detonated unintentionally. An unintentional detonation may occur for various reasons, including human error, flaws in the equipment, software, circuitry, etc., or other environmental factors. Some circumstances may relate to the control module up to and including the igniter, and others may relate to the explosives or environmental conditions. The control module and detonation sub discussed below is designed to activate an electronic charge for single activation, downhole applications. The electronic charge may pressurize hydraulic fluid to perform a function in a wellbore, such as to cut a sand line or to make holes in downhole tubing. The control module is primarily used for service operations. The discussion below relates to reducing the risk of unintentional detonation related to the control circuit by controlling the conditions or circumstances under which the igniter may be activated.

Figure 1:
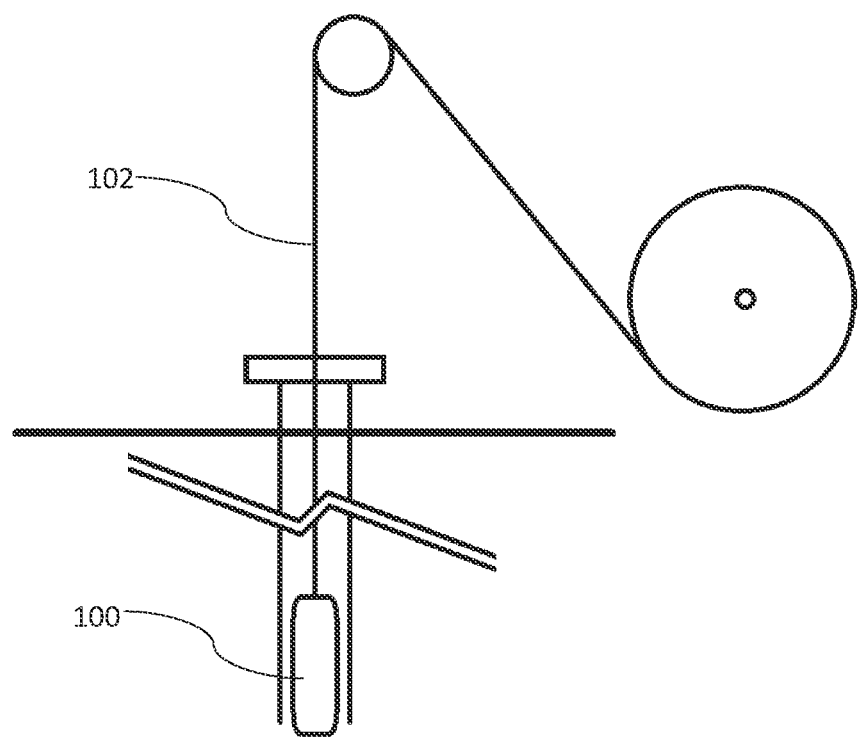
FIG. 1 is a schematic diagram of a downhole tool.

Referring to FIG. 1, a typical arrangement for running a downhole tool 100 on a wireline, such as a slickline 102, is shown. Where downhole tool 100 is carried by slickline 102, communications with downhole tool 100 can be difficult without specialized or complex equipment. As used herein, slickline 102 refers to a type of wireline that does not include any communication lines. Downhole tool 100 may also be run in on other types of conveyances, however downhole tool 100 described herein is designed to operate independently or with minimal control from surface. When downhole tool 100 includes a detonation sub 10 (shown in FIG. 2a-2c), downhole tool 100 may include a control module 30. Referring to FIG. 3, control module 30 is designed to initiate detonation using an igniter 34, which may or may not be integrated into control module 30. Detonation sub 10, shown in FIG. 2a-2c, may be used directly or may activate another downhole tool 100. For example, the detonation may generate a force within an expansion chamber or fire a slug into hydraulic fluid to actuate downhole tool 100.

Figure 2A:
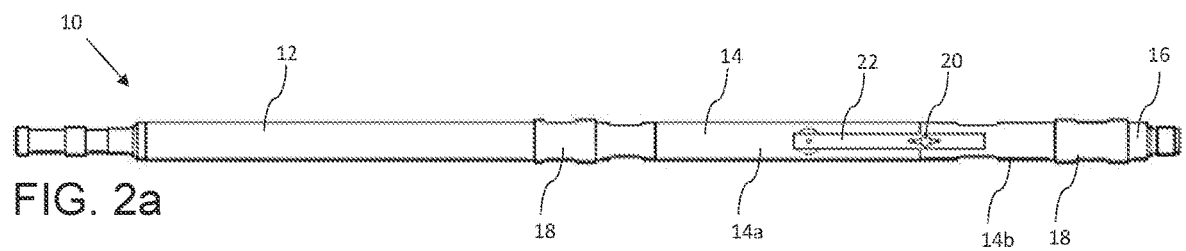
FIG. 2a is a side elevation view of a detonation sub configured for transport.
Figure 2B:
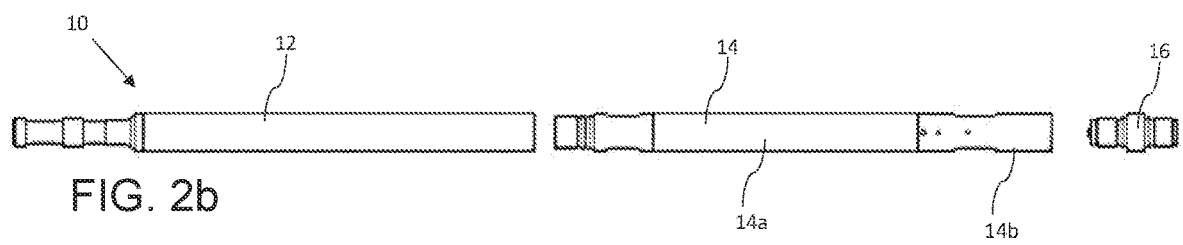
FIG. 2b is a side elevation view of a detonation sub before assembly.
Figure 2C:
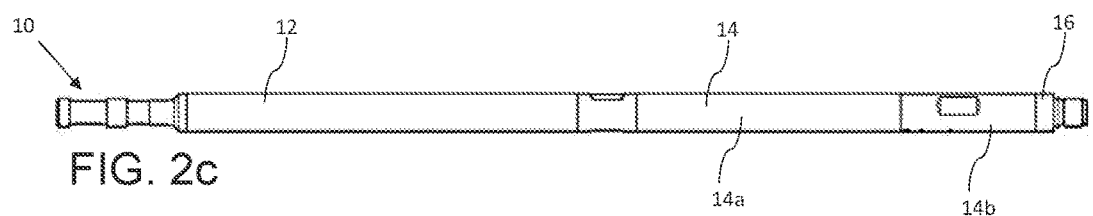
FIG. 2c is a side elevation view of an assembled detonation sub.
Figure 3:
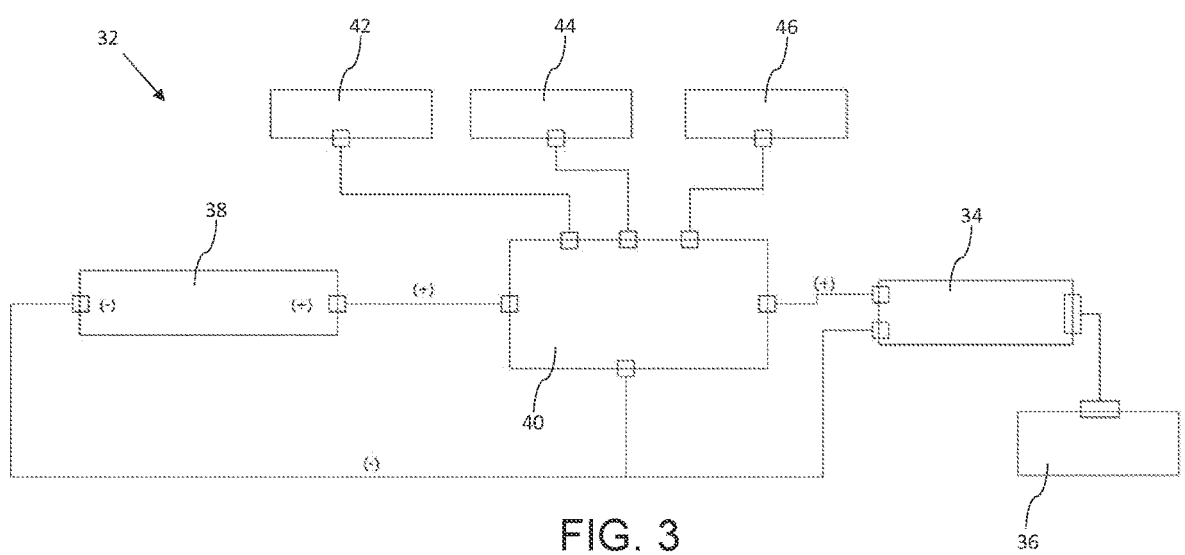
FIG. 3 is a schematic diagram of a control circuit of a control module of a detonation sub.

Referring to FIG. 2a-2c, an example of detonation sub 10 is shown that has multiple parts, including, from top to bottom (shown left to right in the drawings), a battery tube 12, a timer tube 14, and a shell chamber 16 that carries the powder charge and slug. Detonation sub 10 may be designed with a longer length in order to reduce the diameter, as there are often more restrictions on the diameter instead of the length of detonation sub 10. The length and diameter may be designed to accommodate intended well restrictions. Referring to FIG. 2a, the sub may include additional components to protect the tool during transport, such as plastic insulators 18 as shown, that are positioned between the battery tube and the timer tube, and between the timer tube and the shell chamber. These are removed as shown in FIG. 2b during assembly. Referring to FIG. 2c, the assembled tool is shown. Detonation sub 10 may be designed such that, once battery tube 12 is attached, the order of operations are commenced. Referring again to FIG. 2a, timer tube 14 may be a two-part component with first and second timer tube sections 14a and 14b that may be properly aligned, such as by using dowel pins 20 or other alignment profiles. A magnetic safety switch activator bar 22 may be connected to timer tube sections 14a and 14b, and is held in place by a removable attachment, such as a wingnut, that may be easily removed.

Referring to FIG. 3, a block diagram for a control circuit 32 of control module 30 is shown that includes an igniter 34 that fires a powder charge 36 in the downhole tool 100. The details of igniter 34, powder charge 36, and downhole tool 100 may vary, depending on the operation being performed and the preferences of the operator or designer. In the embodiment discussed below, igniter 34 is electrically initiated by control circuit 32.

As shown, control circuit 32 includes a timer chip 40 that is powered by a power supply 38, which also provides the power required to initiate ignition. Control circuit 32 may include other inputs and devices that may be used to determine whether conditions are appropriate to ignite the detonation. The depicted example includes a magnetic switch 42, a temperature sensor 44, and a pressure sensor 46, although other devices and other combinations may be used.

Control circuit 32 may be configured to require a certain order of events to avoid unintentional ignition. For example, magnetic switch 42 may be activated by mounting a magnet (not shown) to control circuit 32 to activate magnetic switch 42. Control circuit 32 may be designed to require the magnet to be present and/or to be removed in a certain sequence or within a certain period of time in order to properly initiate a timing sequence. For example, the magnet may be mounted to activate magnetic switch 42 before power supply 38 is connected, and then removed within a specified time after power supply 38 is connected, such as 20 minutes or less. The timing sequence may then start once the magnet has been removed. For predictability and safety, if a battery of power supply 38 is removed, the timing sequence may be designed to stop and reset.

Using these components, control circuit 32 may require magnetic switch 42 to be activated and power supply 38 connected in a predetermined order and within a predetermined period of time, failing which the timing sequence will fail to initiate or the tool may need to be reset. This helps reduce the likelihood that the timing sequence will be initiated unintentionally. Instead of magnetic switch 42, a different type of switch may be used to achieve the same benefits. For example, the switch may be a mechanical switch, a key, etc. A benefit of magnetic switch 42 is that it may be activated through a sealed housing and without providing any moving parts.

Power supply 38 may be a battery, and control circuit 32 may be designed to require the voltage to be within a specified range. For example, if a 9V battery is used as the battery pack, control circuit 32 may be designed to only start and operate timer chip 40 if the voltage is within a range of, for example, 7.5V and 10.5V. If voltage is disconnected or is out of the predetermined range, either at the time power supply 38 is connected or after the timing sequence is initiated and before ignition, the timing sequence may be aborted and require the sequence to be restarted. In addition, wiring issues or removal of battery may terminate the timing sequence. The battery may be a commercially available battery that is removably installed in electrical communication with control circuit 32. Other types of power supplies 38 may also be used, such as an integrally formed electrical storage device that is charged by an external source or an integrally formed storage device that is electrically disconnected from control circuit 32. The order of events may require magnetic switch 42 to be activated to allow the storage device to be charged, or to place the storage device in electrical communication with the circuit.

The timing sequence may have a predetermined time period between when the timing sequence is initiated and ignition, and control circuit 32 may be designed to prevent the end user from adjusting this time. For example, the time period may be a preset time that allow for adequate time to position detonation sub 10 in the well, such as 60 minutes or more. The time period may be clearly indicated, such as by color coding, numbers clearly visible on the housing, and/or other visual indicators. Control circuit 32 may be designed to prevent the time period from being adjusted by unauthorized personnel, or only under certain circumstances, such as with an electronic or physical access key, which may include a password, etc. Preventing the time-period from being changed helps avoid potential miscommunications or misunderstandings.

In addition to ensuring the timing sequence is initiated only in certain circumstances, other safety measures may be provided. For example, as noted above, a voltage sensor may be used to monitor power supply 38 and ensure correct operation, or other self-diagnostic tools and circuits may be included in control module 30 to stop the timing sequence in the event of a fault. Temperature sensor 44 be included, where control module 30 is programmed to prevent ignition if, when ignition is to occur temperature sensor 44 is not within a predetermined temperature range or the change in temperature is not sufficient, based on the expected downhole conditions. In this example, temperature sensor 44 may record an initial temperature reading when the timer is started, and before the timer ignites primary igniter 34, control module 30 will read the temperature and compare it to the initial reading. This option may be used to ensure the timer has warmed up or cooled down the required amount determined by an operator to ensure firing only occurs at the desired operating temperature.

Another safety measure may involve the use of pressure sensor 46, where control module 30 may be used to compare the pressure prior to ignition to an initial reading and prevent ignition if a predetermined threshold has not been met. This may be used, for example, to prevent ignition if the tool is at atmospheric pressure found at the surface compared with the pressure downhole.

Temperature sensor 44 may measure the ambient temperature sensor or an internal temperature, or both ambient and internal temperatures. An internal temperature sensor, or other suitable device, may only allow ignition to occur if the internal temperature of control module 30 is within a predetermined range, such as 126° C. max and −40° C. min, or other suitable range that may be based on the temperature ratings of the various components. If a temperature higher or lower than this range is present the timing sequence may be cancelled. This may be used to help avoid unintentional detonations caused by electronic issues in high or low temperature environments. An ambient temperature may also be used to ensure control module 30 is in the expected environment for detonation, based on the expected temperature in a given downhole environment. If the ambient temperature is outside a given range, or the temperature has not changed sufficiently from the point of activation (i.e. as an indication of whether the tool is at surface), the timing sequence may be cancelled.

Other sensors or devices may include orientation sensors to detect the orientation of the tool, and accelerometers or gyroscopes that may be used to detect movement, position, or an approximate distance travelled before ignition.

Some safety measures may be included in the programming or design of control module 30. For example, timer 40 may be designed to only send a predetermined number of electrical signals or send a signal for a predetermined time to initiate detonation, such as signaling igniter 34 for a period of 2 seconds. If detonation does not occur within these constraints, control module 30 and/or the detonation sub 10 may be disabled. For example, control module 30 may disconnect power supply 38 or igniter 34 after the ignition signal is generated. This may be useful in the event of a misfire to help prevent detonation sub 10 from unintentionally detonating while or after the tool is retrieved. Once disabled, control module 30 may require a reset or rebuild before it may be used again. In some circumstances, a specialized tool or key may be required to ensure the tool can only be re-initialized by trained or authorized personnel.

Control module 30 may be provided with sufficient memory to record the details of a failure, such as a relative or absolute time the failure occurred, and the reason for the failure. This may be useful in determining the reason for the failure and helping ensure the tool operates effectively when reset. The memory may retain the information after power supply 38 has been removed or ceases to provide power.

The detonation sub 10 may be designed such that certain features are required, while others are optional when detonation sub 10 is being activated. For example, control module 30 may be designed to require magnetic switch 42 to be removed as described above in order to operate in all circumstances, while other features, such as external pressure sensors 46 and/or temperature sensors 44 may be engaged or disengaged at the option of the user. These options may be restricted using various security measures such that they may only be modified by authorized and/or trained personnel.

Other design features may include:
  embedding the timer chip 40 and/or other components in an epoxy or tamper-proof housing to prevent unauthorized access, and a wax or tape seal to ensure it has not been opened since certification;
  permitting modifications, resets, or recertifications under a different power supply, such as a 20V power supply instead of a 9V power supply used to power the tool in operation;
  a time adjust dial within the for authorized personnel, there may be a time adjust dial to modify the timing sequence, a light to verify the time has been set to the chip, a color-coded chip, a short test cycle to verify the integrity of the electronics in the control module or test mode to verify the various sensors and components are functioning correctly;
  a specialized case in which control module 30 must be placed, or connected to another type of specialized test fixture, computer program, etc., to permit modifications or resets to occur, which prevents settings from being adjusted in the field;
  saving a log file that records actions taken by the timer 40 and/or other components of control module 30, such as magnet location, input power, temperature, discharge status, etc., which may be used for record purposes and to troubleshoot failed activation attempts.

Figure 4:
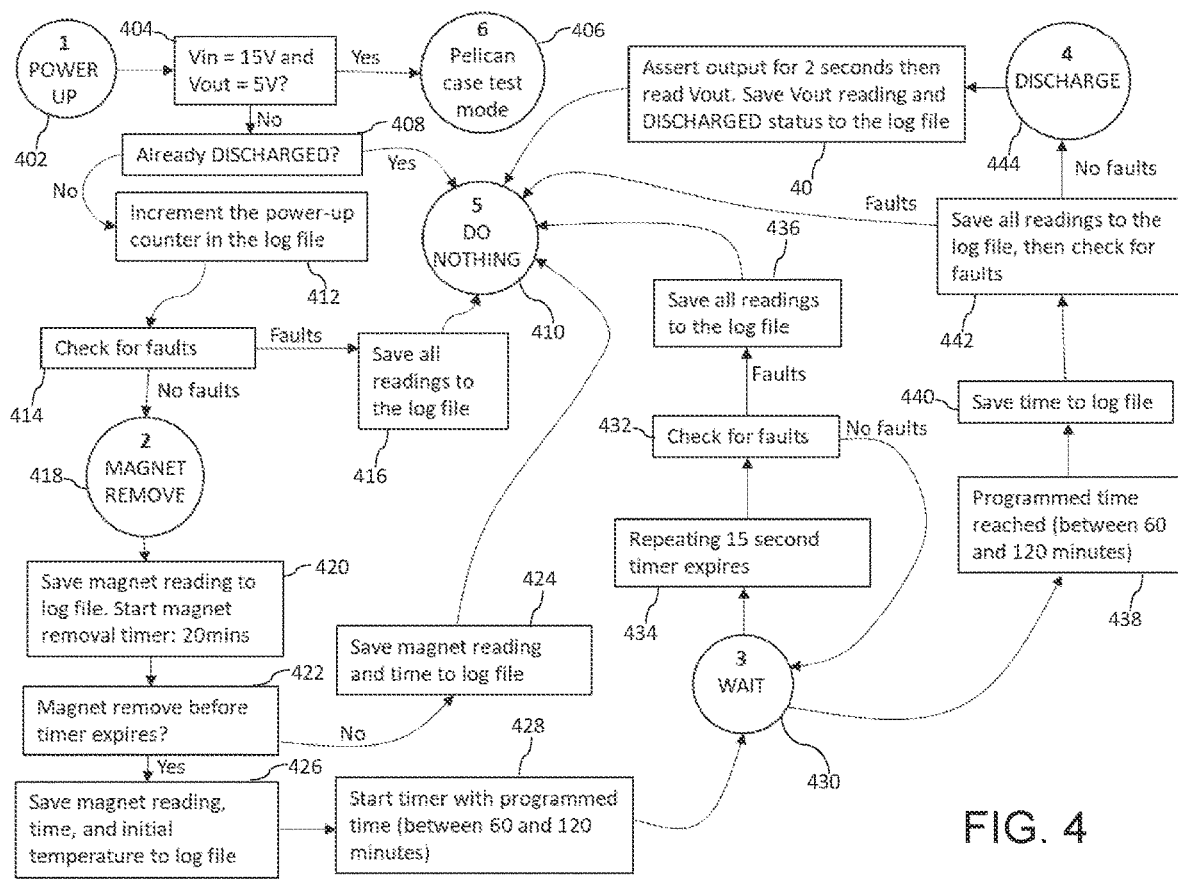
FIG. 4 is a state diagram for a control module of a detonation sub.

By way of illustration, FIG. 4 depicts a state diagram of one implementation of control module 30, although variations are possible. The first stage 402 involves powering up control module 30. The input voltage is checked to see if is 15V and the output voltage is checked to see if it is 5V in step 404. If true this indicates that control module 30 is in a carrying case, such as a pelican case, and the device enters a test mode 406. In step 408, if it is determined ignitor 34 has already been discharged, control module 30 takes no action and moves to the do nothing state 410. Otherwise, the power-up counter is incremented in step 412, and a series of indicators in control module 30 is checked for faults in step 414. The faults that are tested for may include the following:
  Vin is above 10V.
  Vout is below 8V.
  Vout is above 0V.
  Magnet reading too low
  Temperature below −40° C.
  Temperature is above 125° C.
  Vref is incorrect
  Programmed time checksum fail If faults are detected, control module 30 saves all readings to the log file in step 416 and takes no action, moving to the do nothing state 410. If no faults are detected, the next action is to remove the magnet. Under the magnet removal process initiated in step 418, the timer to remove the magnet is started in step 420. In step 422, it is determined whether the magnet is removed after the initiation time period expires. If the magnet is not removed before the initiation time period expires, the magnet reading and time is recorded in the log file in step 424, and the control module 30 takes no action, moving to the do nothing state 410. If the magnet is removed before the initiation time expires, the magnet reading, time, and temperature is saved to the log file in step 426 and the ignition timer starts in step 428, which has been predefined as a period of, for example, between 60 and 120 minutes, or as required. Control module then transitions to a wait stage 430 for the duration of the ignition timer period. During the ignition timer period, control module 30 periodically conducts a self-check for faults, such as every 15 seconds or so, in steps 432 and 434, respectively. The faults checked for may include the faults listed above. If no faults are found, the ignition timer period continues. If a fault is discovered, the fault is logged in step 436, and control module 30 is deactivated, moving to the do nothing state 410. Once the end of the ignition timer period is reached in step 438, the time is saved to the log file in step 440, all readings are saved to the log, and a final check is made for faults in step 442. The faults checked for may include the faults listed above, along with a check to see if the temperature is below an initial temperature reading plus 0° C. If a fault is found, control module 30 is deactivated, moving to the do nothing state 410. If no faults are found, the discharge occurs in step 444. Once the discharge event is complete, the output is asserted for 2 seconds and Vout is read, with the Vout reading and the discharged state saved to the log file in step 446. Control module 30 is deactivated, moving to the do nothing state 410. It should be noted that the "do nothing" step 410 is effectively a reset that requires the process to be restarted, such as by requiring the magnet to be placed against control module 30 and return to an initial step, such as power up step 402.

In this patent document, the word "comprising" is used in its non-limiting sense to mean that items following the word are included, but items not specifically mentioned are not excluded. A reference to an element by the indefinite article "a" does not exclude the possibility that more than one of the elements is present, unless the context clearly requires that there be one and only one of the elements.

The scope of the following claims should not be limited by the preferred embodiments set forth in the examples above and in the drawings but should be given the broadest interpretation consistent with the description as a whole.

What is claimed is:

1. A control module for a detonation sub, comprising:
   a control circuit having a switch, a power supply input, a timer circuit, and a detonation signal output electrically connected to a detonator; and
   a power supply that is selectively connected in electrical communication to the power supply input;
   wherein the timer circuit is initialized by activating the switch prior to connecting the power supply and deactivating the switch within an activation time, wherein, once initialized, the timer circuit generates a detonation signal after a detonation time.

2. The control module of claim 1, wherein the switch is a magnetic switch and is actuated by proximity to a magnet.

3. The control module of claim 1, wherein the control circuit fails to initialize if the switch is not deactivated within the activation time.

4. The control module of claim 1, wherein the control circuit is configured to deactivate the detonation signal if the control circuit detects a fault.

5. The control module of claim 4, wherein the fault is detected based on readings from a temperature sensor, a pressure sensor or both a temperature sensor and a pressure sensor.

6. The control module of claim 4, wherein the control circuit is programmed to detect a fault by periodically performing a diagnostic check.

7. The control module of claim 1, wherein the control circuit comprises a test mode and an operational mode, the control module accessing the test mode by applying a first voltage and accessing the operational mode by applying a second voltage that is distinct from the first voltage.

8. The control module of claim 1, wherein the control module is configured such that, after activating the switch, if the timer circuit fails to initialize or is deactivated, the timer circuit can only be initialized by activating the switch prior to connecting the power supply and deactivating the switch within an activation time.

9. A detonation sub, comprising:
   a power supply;
   a control module, comprising:
      a control circuit having a switch, a power supply input, a timer circuit, and a detonation signal output;
      wherein the timer circuit is initialized by activating the switch prior to connecting the power supply and deactivating the switch within an activation time, wherein, once initialized, the timer circuit generates a detonation signal after a detonation time;
   a detonator electrically connected to receive a detonation signal from the detonation signal output; and
   an explosive charge that is detonated by the detonator.

10. The detonation sub of claim 9, wherein the switch is a magnetic switch and is actuated by proximity to a magnet.

11. The detonation sub of claim 9, wherein the control circuit fails to initialize if the switch is not deactivated within the activation time.

12. The detonation sub of claim 9, wherein the control circuit is configured to deactivate the detonation signal if the control circuit detects a fault.

13. The detonation sub of claim 12, wherein the fault is detected based on readings from a temperature sensor, a pressure sensor or both a temperature sensor and a pressure sensor that are not indicative of a downhole environment.

14. The detonation sub of claim 9, wherein the control module is configured such that, after activating the switch, if the timer circuit fails to initialize or is deactivated, the timer circuit can only be initialized by activating the switch prior to connecting the power supply and deactivating the switch within an activation time.

15. A slickline tool, comprising:
   a slickline having a connection point;
   a detonation sub connected to the connection point such that the detonation sub is carried by to the slickline, the detonation sub comprising:
      a power supply;
      a control module, comprising:
         a control circuit having a switch, a power supply input selectively connected to the power supply, a timer circuit, and a detonation signal output;
         wherein the timer circuit is initialized by activating the switch prior to connecting the power supply and deactivating the switch within an activation time, wherein, once initialized, the timer circuit generates a detonation signal after a detonation time;
      a detonator electrically connected to receive a detonation signal from the detonation signal output; and
      an explosive charge that is detonated by the detonator.

16. The slickline tool of claim 15, wherein the switch is a magnetic switch and is actuated by proximity to a magnet.

17. The slickline tool of claim 15, wherein the control circuit fails to initialize if the switch is not deactivated within the activation time.

18. The slickline tool of claim 15, wherein the control circuit is configured to deactivate the detonation signal if the control circuit detects a fault.

19. The slickline tool of claim 18, wherein the fault is detected based on readings from a temperature sensor, a pressure sensor or both a temperature sensor and a pressure sensor that are not indicative of a downhole environment.

20. The slickline tool of claim 15, wherein the control module is configured such that, after activating the switch, if the timer circuit fails to initialize or is deactivated, the timer circuit can only be initialized by activating the switch prior to connecting the power supply and deactivating the switch within an activation time.

21. A method of operating a detonation sub, the detonation sub comprising a control circuit having a switch, a power supply input, a timer circuit, and a detonation signal output, the method comprising the steps of:

initiating the timer circuit by:
  with the switch activated, connecting a power supply to the power supply input;
  with the power supply connected to the power supply input, deactivating the switch within an activation time, such that the timer circuit begins timing a detonation time period, the control circuit being adapted to conduct periodic diagnostic checks during the activation time and the detonation time period to detect faults, and to deactivate if a fault is detected;
lowering the detonation sub downhole to a desired location;
once the detonation time period ends, permitting the control circuit to generate a detonation signal at the detonation signal output if no faults have been detected; and
deactivating the control circuit after the detonation signal has been generated whether detonation has occurred or not.

22. The method of claim 21, wherein, after activating the switch, if the timer circuit fails to initialize or is deactivated, the timer circuit can only be initialized by activating the switch prior to connecting the power supply and deactivating the switch within an activation time.

23. The method of claim 21, wherein the timer circuit is deactivated if readings from a temperature sensor, a pressure sensor or both a temperature sensor and a pressure sensor are not indicative of a downhole environment prior to the detonation time period ending.

* * * * *